United States Patent
Lin et al.

(10) Patent No.: US 9,468,025 B2
(45) Date of Patent: Oct. 11, 2016

(54) SYSTEM AND METHOD FOR CONFIGURING DEVICE CONNECTIONS IN AN EXTENDED NETWORK ENVIRONMENT

(71) Applicant: NETGEAR, Inc., San Jose, CA (US)

(72) Inventors: Yu-Te Lin, Taipei (TW); Bing-Huang Cheng, Taichung (TW)

(73) Assignee: Netgear, Inc., San Jose, CA (US)

(*) Notice: Subject to any disclaimer, the term of this patent is extended or adjusted under 35 U.S.C. 154(b) by 220 days.

(21) Appl. No.: 13/974,090

(22) Filed: Aug. 23, 2013

(65) Prior Publication Data

US 2015/0055566 A1 Feb. 26, 2015

(51) Int. Cl.
H04W 76/02 (2009.01)
H04W 24/10 (2009.01)
H04W 48/20 (2009.01)

(52) U.S. Cl.
CPC ............ *H04W 76/02* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 2008/0205317 A1* | 8/2008 | Piipponen | H04L 12/2602 370/311 |
| 2014/0241182 A1* | 8/2014 | Smadi | 370/252 |
| 2015/0043530 A1* | 2/2015 | Bharghavan et al. | 370/331 |

* cited by examiner

*Primary Examiner* — Awet Haile
(74) *Attorney, Agent, or Firm* — Boyle Fredrickson, S.C.

(57) ABSTRACT

An extended network is configured to implement an extended management function to identify a wireless access device providing a highest quality wireless connection to a wireless device. The extended network includes a gateway wireless access device configured to enable communication between the extended network and an external network, at least one additional wireless access device in the extended network, and at least one wireless device having a wireless connection to a least one of an additional wireless access device and the gateway wireless access device. At least one wireless access device includes a processor executing the extended management function to identify the wireless access device providing the highest quality wireless connection based on wireless connection quality information transmitted from each wireless access device.

21 Claims, 6 Drawing Sheets

SYSTEM AND METHOD FOR CONFIGURING DEVICE CONNECTIONS IN AN EXTENDED NETWORK ENVIRONMENT

CROSS-REFERENCE TO RELATED APPLICATIONS

None.

FIELD OF INVENTION

This invention generally relates to the field of providing a network connection between a network device and one of a plurality of wireless access devices in a network environment and more particularly to a system and method for providing a network connection between a network device and one of a plurality of wireless access devices based on the detection of an alternative access point providing one or more advantages over a current access point.

BACKGROUND OF THE INVENTION

In computer networking, a wireless access device (WAP) is a device that allows wireless devices to connect to a wired or wireless network using a wireless communication protocol, such as Wi-Fi or Bluetooth. The wireless access device typically connects to or is implemented as a component of a muter connected to a wired external network, such as a local network or the Internet. A wireless access device connected to or implemented with a router is referred to as a WiFi router. A network device connected to an external network is referred to as a "gateway," while a wireless access device connected to an external network may be referred to as a "gateway wireless access device" or a "gateway." So a "gateway" device referenced in this document can have a wireless interface or have no wireless interface, but it is a device connecting the internal network and the external network.

Wireless access devices utilize a wireless connection between the wireless device and the wireless access device to transfer data. The area in which a wireless connection between the wireless device and the wireless access device can be established and maintained is the wireless coverage area or simply the "coverage area." HOW ever, even within the coverage area, the speed at which the data is transferred is dependent on the quality of the wireless connection. A high quality wireless connection relies on multiple different wireless connection quality factors. For example, the quality of a wireless connection may be determined based on the signal strength that exists between the wireless access device and the wireless device. Additionally, the quality of a wireless connection may depend upon communication capability of the devices, determined by the wireless technology implemented on each device. For example, different devices implement different communication protocols, have different processing power, have different antenna configurations, etc. Users and provider of wireless access device continuously strive to maximize the quality of their wireless connection, particularly when using data intensive applications such as video streaming, telephony applications, etc.

Often, the area where a user wishes to use his or her wireless device is larger than the area providing a high quality wireless connection to the wireless access device. For example, the signal strength decreases based on the distance between the wireless access device and the wireless device. Additionally, certain areas that would otherwise receive a high quality wireless connection are subject to interference that reduces the quality of the wireless connection. Accordingly, users may add additional wireless access devices to their network, such as a WiFi extender, to increase the area where the user can maintain a high quality wireless connection.

WiFi extenders typically are similar to wireless access devices, but do not include an integral router connected to the external network. Instead, WiFi extenders typically rely on wired or wireless connections to the WiFi router to connect to the external network. The coverage area in which a user can connect to at least one wireless access device is considered the "extended network environment." A network including both a gateway wireless access device and one or more extender wireless access devices is referred to as an "extended network."

A WiFi extender is a wireless access device for wireless devices to connect to a network. Additionally, the WiFi extender acts as a wireless device to connect to another wireless access device in order to connect to a network. The "another wireless access device" may also be referred to as an "upstream wireless access device". Usually, a WiFi extender uses a single radio frequency device component to connect to both the wireless devices and the upstream wireless access device. Further, in order to avoid had performance, the radio frequency device has to work in the same frequency to connect to the wireless devices as well as to connect to the upstream wireless access device. In such a usage, when a wireless device transmits or receives data from the upstream wireless access device, the transmission between the upstream wireless access device and the WiFi extender and the transmission between the WiFi extender and the wireless device share the same frequency. Assuming there is no other usage on this frequency, the two transmissions must divide the time of using the frequency and so the end to end throughput is not as high as the wireless device can see from its connection to the WiFi extender. For example, if the speed between the wireless device and the WiFi extender and between the WiFi extender and the upstream wireless access device are the same like 100 mbps, then the speed for transmitting data between the wireless device and the upstream wireless access device is cut in half, like to become around 50 mbps.

Typically, wireless devices establish a connection with a single wireless access device in an extended network based on a determination of which wireless access device will provide the highest quality wireless connection. The single wireless access device having a wireless connection to the wireless device is referred to herein as a "current wireless access device." Once established, this wireless connection is maintained between the wireless access device and the wireless device until the connection is lost or degrades below a threshold quality level. The connection may be lost or degraded when the wireless device moves out of range of the wireless access device, moves to a location where there is interference, etc. Thereafter, the wireless device will attempt to establish a new wireless connection; again with whichever wireless access device will provide the highest quality wireless connection.

However, wireless devices often are transported to various areas within a coverage area covered by multiple wireless access devices without ever losing their connection to their current wireless access device. Because of variations in the quality of the wireless connection within the coverage area, users may not always be connected to the wireless access device that will provide the highest quality wireless connection. For example, a wireless device user connected to a first wireless access device may move to location that is remote from that wireless access device (although still maintaining a wireless connection), but is very close to a second wireless access device (that would provide a higher quality wireless connection at the new location). As a result, the wireless device will receive a signal that is weaker than optimal.

In a home network, there is a router or gateway that connects the internal network, the home network, and the external network, the Internet. For a home network where there is more than one wireless access device for a wireless device to reach the gateway or the external network, almost no wireless device knows which wireless access device can give it better connection to the network. This is because a wireless device does not know which access device has a better connection to the router/gateway and the interpretation of speed for different access devices could be different. For example, when a client sees one connection of 10 mbps from one access device and one connection of 7 mbps from another access device. If the 10 mbps connection is from a gateway, then it is a better connection than the other. If the 10 mbps connection is from an extender, as elaborated previously, the connection speed from the wireless device to the gateway (the upstream access device) could be just 5 mbps, and so the 7 mbps direct connection to the gateway is actually the better connection. In a general way, a home network has a tree topology. The root is the router/gateway, the nodes are extenders, and the leaves are wireless devices or wired devices. The whole tree is connected to the Internet through the router/gateway at the root. There could be multiple extenders connecting to the router/gateway directly and there could be extenders connecting to an upstream extender and then connecting to the router/gateway indirectly. For a wireless device, the connection quality provided by each node in the tree, including the root if it is a gateway wireless access device, is determined by not only the node's signal strength to the device, the wireless capability of the node . . . but also the connection quality between the node and the root.

What is needed is a system and method for configuring wireless connections in an extended network environment that optimizes connection quality to a wireless device in the coverage area. What is further needed is such a system and method configured to continuously monitor wireless connections between a wireless device and a plurality of wireless access devices to optimize the quality of a wireless connection to the wireless device.

SUMMARY

A wireless access device may be configured to determine wireless connection quality information for a wireless device in comparison to at least one other wireless access device. To achieve this functionality, a wireless access device can monitor all packets sent from the wireless device at a certain time for a certain period, even when the wireless device is not connected to the wireless access device or the wireless packets are not intentionally transmitted to the wireless access device. Advantageously, each wireless access device can contribute to the process of identifying the wireless access device providing the highest quality wireless connection based on wireless connection quality information transmitted by or exchanged among the wireless access devices.

According to one embodiment of the invention, a network device is configured to facilitate wireless connection management in an extended wireless network. The network device includes a network device input connected at least indirectly to an internal network and configured to communicate a plurality of packets to and from at least one computer system, a network device output connected at least indirectly to an external network and configured to communicate the plurality of packets to and from at least one computer system. The network device could also be a device that includes a network device input connected directly to one or more wireless devices or wireless access devices and configured to communicate a plurality of packets to and from at least one computer system, a network device output connected at least indirectly to a network and configured to communicate the plurality of packets to and from at least one computer system (the network device input and the network device output could actually use the same hardware device). In addition, such a network device also includes a computer processor configured to execute steps stored in non-volatile memory. The computer processor is configured to receive packets from a wireless device, identify the wireless device within a table of wireless devices communicating with at least one wireless access device in an extended wireless network, and generate wireless connection quality information for the wireless device specific to the wireless access device that received the packets based on the received packets and based on the knowledge of the network topology related information.

In one embodiment, the computer processor is further configured to transmit the wireless connection quality information and partial network topology information to other wireless access devices in the network.

In another embodiment, the computer processor is further configured to exchange wireless connection quality information and partial network topology information with a plurality of other network devices and to identify a network device in the extended network providing the highest quality wireless connection for the wireless device. The processor may be further configured to exchange messages with other network devices to initiate a connection between the wireless device and the network device having the highest wireless connection quality.

In another aspect, the wireless connection quality that is detected includes at least one of a wireless signal strength, a connection capability, a utilization status and a connection patch quality.

According to another aspect of the invention, an extended network configured to implement an extended management function to identify a wireless access device providing a highest quality wireless connection to a wireless device. The extended network includes a gateway configured to enable communication between the extended network and an external network, at least two wireless access devices in the extended network (one could be the gateway if it is a gateway wireless access device), and at least one wireless device having a wireless connection to a least one of the wireless access devices. The wireless access device includes a processor executing the extended management function to identify the wireless access device providing the highest quality wireless connection based on wireless connection quality information and topology information exchanged among the wireless access devices.

According to yet another aspect, a computer implemented method for identifying a wireless access device providing a highest quality wireless connection to a wireless device is described. The method includes monitoring the relative signal strength of packets at a plurality of wireless access devices in an extended network from a wireless device having a current wireless connection to a current wireless access device in the plurality of wireless access devices and generating wireless connection quality information at each wireless access device in the plurality of wireless access devices describing the quality of a wireless connection between the wireless device and the wireless access device.

Other features and advantages of the invention will become apparent to those skilled in the art upon review of the following detailed description, claims and drawings in which like numerals are used to designate like features.

BRIEF DESCRIPTION OF THE DRAWINGS

Preferred exemplary embodiments of the invention are illustrated in the accompanying drawings in which like reference numerals represent like parts throughout, and in which.

Figure 1:
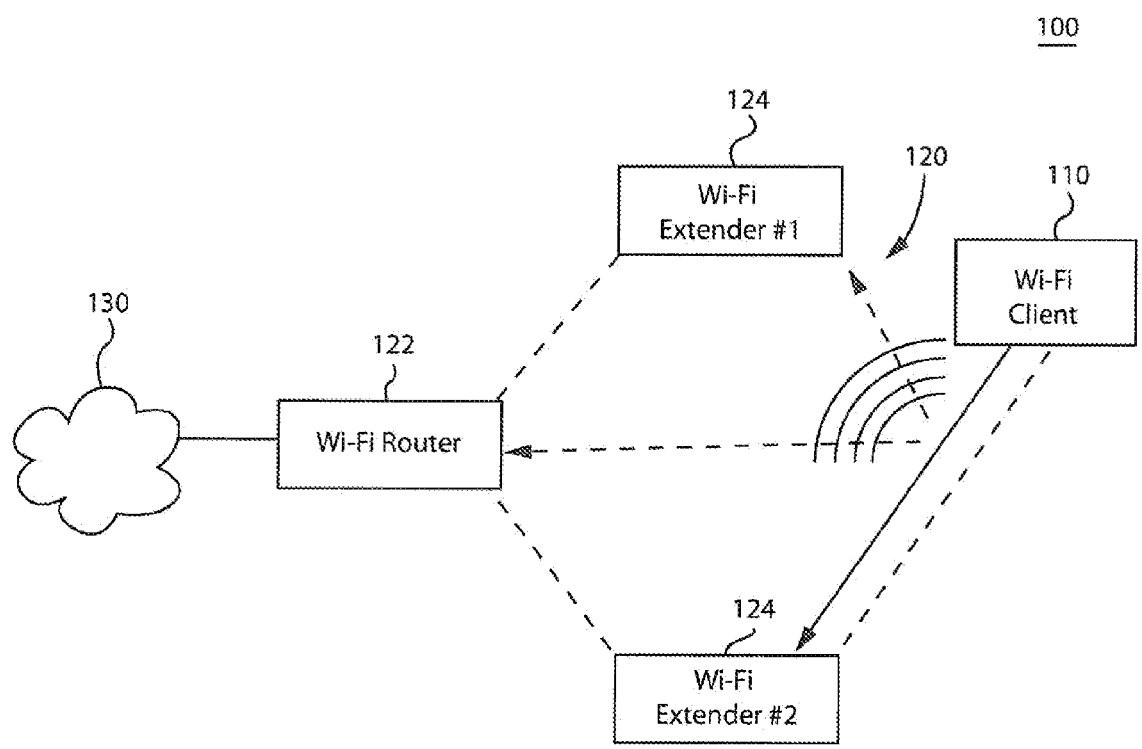
FIG. 1 schematically illustrates an extended networking environment for communicating information between a wireless device and a plurality of wireless access devices, according to an exemplary embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Referring now to FIG. 1, a networking environment 100 for communicating information between at least one wireless device 110 and an external network 130 through an extended network 120 is shown. The extended network includes at least a gateway wireless access device 122 and one or more extended wireless access devices 124. The extended network 120 may further be utilized for communicating information with one or more additional wireless devices (not shown) connected with a wireless access device of the extended network 120.

Extended network 120 is a local area network configured to provide wireless communication of information with a plurality of devices and applications in relatively close proximity to each other, such as within a home, school, office building, etc. Wireless devices or "wi-fi clients" 110 communicating through extended network 120 may include a web application running on a personal computing device such as a desktop computer, a laptop computer, a tablet, etc, a smartphone, a game device, or a streaming media player. The web application may include a web browsing application, a video player application, a telephony application, a video telephony application, etc. It should be understood that although specific devices and applications are described, these are merely provided as examples. Any or all of these or other wireless devices 110 could be present in a given extended network 120.

The gateway wireless access device 122 of extended network 120 is a type of network device that manages the flow of data between extended network 120 and the external network 130. Gateway wireless device may comprise, for example, a router, a switch, or a gateway. Functionality described herein as being associated with gateway wireless access device 122 may be implemented using one or more devices. For example, gateway wireless access device 122 may be configured to include a router in communication with a network switch, either of which can be configured to perform some or all of the functions described herein.

When a data packet is received at either gateway wireless access device 122 or an extended wireless access device 124, an additional or second type of network device, the wireless access device reads address information in the packet to determine its ultimate destination. In a packet-switched network, a "router" is a device which receives packets on one or more input interfaces and which outputs those packets on one of a plurality of output interfaces so as to move those packets within the network from a source device to a destination device. Each packet includes header information, which indicates the destination device in either extended network 120 or external network 130. Additional information is provided by the physical layer to the device which receives a packet directly and that information can further include wireless connection quality information, described in detail below with reference to FIG. 2. The router includes routing information, which associates an output interface with information about the destination device. The router can also perform other operations on packets, such as rewriting the packets' headers according to their routing protocol, or encapsulating the packets from a first routing protocol to a second routing protocol.

Gateway wireless access device 122 may be a gateway device that provides an exclusive communication channel between extended network 120 and external network 130. Accordingly, packets transmitted by extended wireless access devices 124 and/or wireless devices using extended network 120, can be viewed using the gateway wireless access device 122. Gateway wireless access device 122 and extended wireless access device 124 may further be configured to generate wireless connection quality information transmitted to a certain wireless access device (122 or 124) or exchanged among wireless access devices (122 and 124), as described below in further detail. Accordingly, some or all wireless access device (122 and/or 124) are further configured to implement an extended network management function for configuring device connections in an extended network environment, as described in detail below with reference to FIG. 2.

External network 130 may be a wide area telecommunication network covering a broad area, such as the Internet. External network 130 may be connected to network device 120 using a wired or wireless connection. For example, gateway wireless access device 122 may be connected to the external network 130 via a high-bandwidth connection such as a cable modem, a Digital Subscriber Line (DSL) modem, or a 3G/4G Long Term Evolution (LTE) modern connection to send and receive data with systems through external network 130.

External network 130 allows communication with one or more of a plurality of external systems including, for example an external web site, an external computing system, and/or an external database. These systems and applications may be accessible using an Internet Protocol address provided by any of the wireless devices on extended network 120 and used by network device 120 to determine a destination for data transmitted to and/or from extended network 120 to external network 130.

In operation, each wireless access device 122, 124 in extended network 120 is configured to monitor, store, and/or report wireless connection quality information. The wireless connection quality information may be generated at the wireless access device 122 or 124 and/or included in packet headers received at the wireless access device. For example, each access point is configured to monitor the link rate of packets sent from the wireless device 110 and to check the signal strength it receives for those packets, no matter which wireless access device the packets are intentionally transmitted to. Accordingly, each wireless access device can provide wireless connection quality information indicating signal strength from the wireless device 110 and corresponding link rate for packets from the wireless device.

Each wireless access device 122 or 124 in extended network 120 may be further configured to periodically review the wireless connection between the wireless access device and any wireless devices communicating with the wireless access device. The connection check may be performed periodically such as every 5 seconds, based on a reported connection issue, such as an unusually slow connection, etc. A wireless access device can send and receive wireless connection information and a partial network topology with other wireless access devices periodically in an attempt to identify a better connection for a wireless device. In addition, a wireless access device can also monitor an existing connection to identify if the connection with a wireless device becomes bad. If the connection does become bad, the wireless access device starts looking for another wireless access device in the extended network that can provide better a better connection for the wireless device.

The wireless connection quality information received from the wireless device 110 may be stored in a memory of the wireless access device 122 or 124 and/or forwarded to a central repository, such as the memory for gateway wireless access device 122. The wireless connection quality information may be either a simple value, such as a connection speed, or a number of different values, such as connection speed and other quality information for the extended network 120, including the quality for connections between two wireless access devices, for example, for the connection between the gateway wireless access device 122 and an extended wireless access device 124. The wireless connection quality information may be forwarded when it is received, may be periodically forwarded in a batch operation, may be aggregated to provide wireless connection quality information over a defined period of time, etc. Advantageously, the stored wireless connection quality information may be used to determine the particular wireless access device 122 or 124 that can provide the highest quality wireless connection to the wireless device 110 at any particular time. Using the network management system described herein, extended network 120 may be configured to utilize any tree topology including a gateway wireless access device 122 as a root, such as a hub/star configuration, a cascaded configuration, etc.

For example, in a tree topology, the extended network is configured in a tree topology including a gateway device as a root, one or more wireless access devices as nodes in the tree, and a wireless device as a leaf. The network tree topology can have several levels and each level can have several nodes. A node or a wireless access device connects to the network by connecting to its upstream node or wireless access device. A wireless access device can connect to its upstream node in any of a variety of different ways, for example through a wired connection (e.g. Ethernet, and the wireless access device is a Wi-Fi AP), through a wireless connection (e.g. Wi-Fi, and the wireless access device is a Wi-Fi extender), etc. in addition, a wireless access device may be configured to have only one wireless interface where it performs multiplexing on the single wireless interface and uses the same wireless to connect to the extended network as well as to wireless devices. One example of such a device is a Wi-Fi single-band extender.

Although the wireless device 110 will be connected to a single wireless access device 122 or 124 through an existing wireless connection, designated as the "current wireless access device." Establishing a wireless connection may include performance of a handshake protocol and the exchange of data packets as is well known in the art. Once a wireless connection is established, the wireless access device establishing the connection is considered the current wireless access device. Although connected with the current wireless access device, each wireless access device 122 or 124 on extended network 120 is configured to receive any packets transmitted to the current wireless access device from the wireless device 110 and store the observed quality information of these packets independent of whether the wireless access device is providing the wireless connection to the wireless device. Depending on the location/position of each access device relative to the wireless device, the observed signal strength at each access device for a packet from the wireless device (to the current access device) is different. In contrast, in a typical wireless network, this information would be discarded as packets from devices that are not transmitted to a wireless access device were dropped by that wireless access device.

Figure 2:
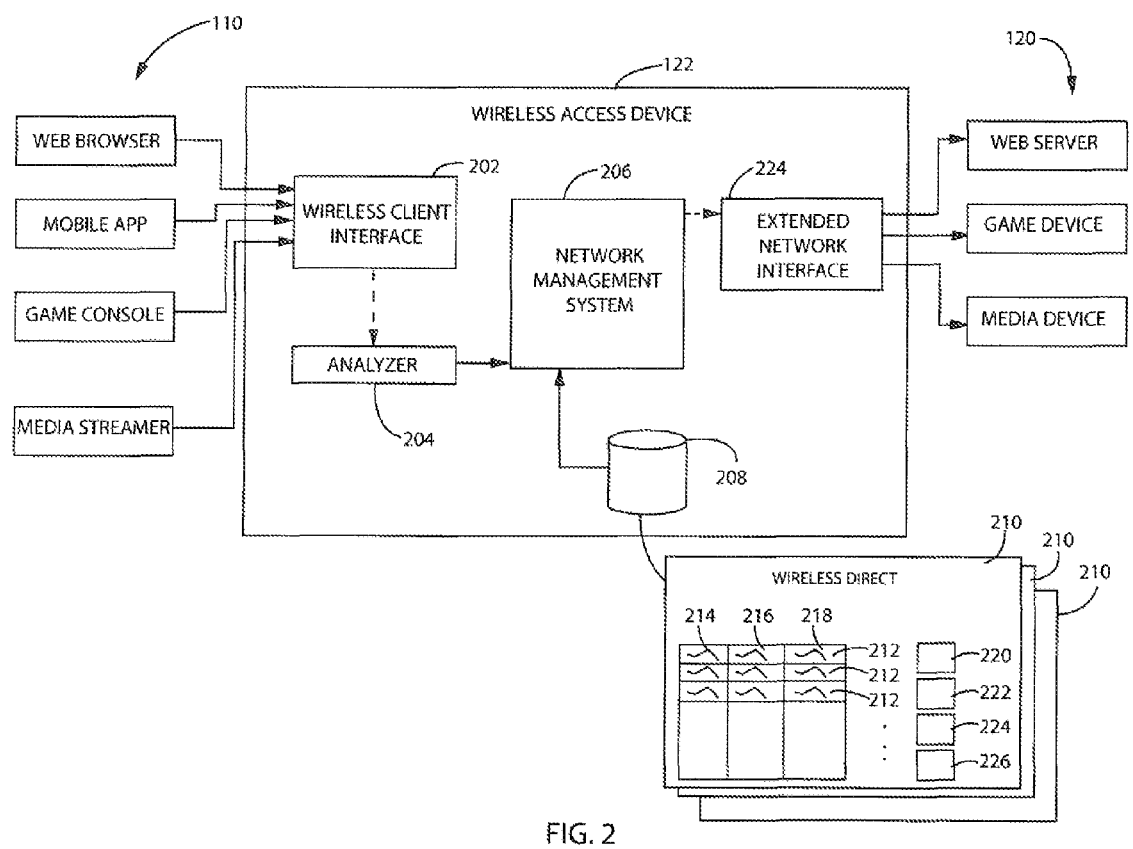
FIG. 2 illustrates an embodiment of the gateway wireless access device of FIG. 1, configured to implement an extended network management function, shown in greater detail, according to an exemplary embodiment.

Referring now to FIG. 2, a gateway wireless access device 122 or simply "gateway" configured to implement an extended network management function as described herein is shown in greater detail, according to an exemplary embodiment. Although gateway 122 is shown in FIG. 2 as including specific components in an exemplary configuration, it is important to recognize that gateway 122 may include more, fewer, and/or a different configuration of components to implement the functions described herein. Further, although the functionality described herein is described as being implemented on a gateway device, the extended network management function can be implemented on a gateway device 122 and/or an extender access device 124. In addition, an implementation may be centralized on one device or distributed among a plurality of devices. For simplicity, the functionality will be described herein below with reference to implementation on a gateway 122.

The functional components (not shown) of gateway 122 may be implemented using hardware including a processing unit, a system memory, and a system bus that couples various system components, including the system memory, to the processing unit. The system bus may be any of several types of bus structures including a memory bus or memory controller, a peripheral bus, and a local bus using any of a variety of bus architectures. Further, the described components may be implemented using hardware and/or software.

The processing unit may be any type of computer processor configured to implement the functionality described herein including the steps of identifying advertising content requests in network packets transmitted through gateway 122. The processing unit may be any type of processor, such as a MIPS processor.

The system memory of gateway 122 includes computer storage media in the form of volatile and/or nonvolatile memory such as read only memory (ROM) and random access memory (RAM). A basic input/output system (BIOS), containing the basic routines that help to transfer information between elements within gateway 122, such as during start-up or networking operations, is typically stored in ROM. RAM typically contains data and/or program modules that are immediately accessible to and/or presently being operated on by the processing unit. The gateway 122 may also include other removable/non-removable, volatile/nonvolatile computer storage media, such as flash memory. Although gateway 122 is shown and described herein as including memory, gateway 122 may alternatively be implemented to store information in a network storage device.

Although gateway wireless access device 122 may be any of a variety of types of network devices, for clarity access point 122 is further described herein as a router type network device. Gateway wireless access device 122 includes a wireless client interface 202, a wireless connection analyzer 204, an extended network management system 206, an extended network management table 208, and an extended network interface 224. Although network device 122 is shown as including, a number of functional embodiments represented as separate components, it should be understood that the same functional component may be used to implement one or more of the functional embodiments.

Wireless client interface 202 is an input/output port receiving/transmitting packets from/to the wireless devices 110. Extended network interface 224 is an input/output port receiving/transmitting packets from/to the extended network 120. Extended network interface 224 connects the access device to the extended network. Extended network interface 224 can be an Ethernet port, a wireless transmitter, or another device for receiving/transmitting packets from/to extended network 120. The physical device for the wireless client interface 202 and the extended network interface 224 can be the same. A simple extended access device 124 can be configured to have only one network interface (a wireless interface) such that both wireless client interface and extended network interface are through the only network interface.

Wireless connection analyzer 204 is a software component configured to analyze and determine wireless connection quality between the wireless access device 122 and a wireless device. Although shown specifically within gateway wireless access device 122, a wireless connection analyzer 204 is implemented in the extended network 120 on the wireless access devices 122 and 124 in the network. Accordingly, each wireless access device 122, 124 in the extended network is configured to be able to obtain information used to determine the wireless connection quality between that wireless access device and the wireless devices within the extended network 120.

The wireless connection analyzer 204 associated with each wireless access device 122, 124 is configured to generate a wireless connection quality table entry to be stored in an extended network management table 208. The specific data used to generate the wireless connection quality table information is described, in further detail below with reference to the extended network management table 208.

The analyzer 204 may generate the table entry based on information received from the wireless device in packet headers, based on data received from components in the wireless access device, such as a signal strength detection system (not shown), based on data received from other wireless access devices in the extended network, etc.

Each wireless connection analyzer 204 is further configured to generate the wireless connection quality table entry for each wireless device 110 associated with any wireless access device on the extended network. The analyzer 204 associated with each wireless access device 122 or 124 can be configured to generate the table entry independent of whether the associated wireless access device is connected to the wireless device 110, being used in the connection path to gateway wireless access device 122, etc. The analyzer 204 associated with each wireless access device 122 or 124 can be further configured to generate the wireless connection quality table entry for each other wireless access device 122 or 124 that connects to it.

Extended network management system 206 is a software application implemented in a root or central wireless access device for an extended network, such as gateway wireless access device 122. In an alternative embodiment, network management system 206 may be implemented as a distributed system in a plurality of wireless access devices. Management system 206 is configured to implement a management protocol in the extended mesh network to determine the wireless access device that can provide the highest quality wireless connection to a wireless device at any particular time. Accordingly, management system 206 is configured to store and maintain the extended network management table 208 based on connection quality data received by the wireless access devices in the network and exchanged among wireless access devices in the network. Table 208 may also be generated to include data connection quality data generated locally at each wireless access device 122 or 124.

Extended network management table 208 is generated and stored with the memory of gateway 122 and/or any other wireless access device. Table 208 includes a unique wireless access device record 210 for each wireless access device 122, 124 communicating through the extended network 120. Each record 210 includes a plurality of wireless connection quality table entries 212, one for each wireless device in the extended network 120. Accordingly, table 208 may be stored and maintained in memory remote from device 122, such as would be implemented in a cloud computing environment.

Each wireless connection quality table entry 212 in the network management table 208 is specific to the wireless connection between one wireless access device 122 or 124 and one wireless device 110. Accordingly, table entries 212 include a wireless access device identifier 214, a signal strength data field 216, and a wireless capability field 218 for the wireless device 110. Each wireless access device record 210 for a wireless access device 122, 124 includes a utilization status data field 220 for each wireless band (e.g., 2.4 GHz, 5 GHz), a noise field 222 for each wireless band, a wireless capability field 224 for the wireless access device, and a connection path quality data field 226 describing the connection path for each wireless access device 124 in the path to the gateway wireless access device 122, (i.e., determined by the connection quality between any two contiguous wireless access devices on the path between the current wireless access device and the gateway wireless access device 122). For the gateway wireless access device 124, this field is set to the highest value in the extended network 120.

According to a specific implementation, table 208 includes one record 210 for each wireless access device in the extended network. In each record for an access device, there is a table for the wireless clients connected to that access device. Each table entry 212 corresponds to a wireless client connected to the access device. Some fields (214, 216, 218) are associated with a table entry since they are specific to a wireless client, while other fields (220, 222, 224) are associated with a record since they are not specific to a wireless client but are specific to a wireless access device.

Extended network management system 206 is configured to identify the wireless access device that can provide the highest quality wireless connection with a wireless device at any given time. According to exemplary embodiment, management system 206 identifies highest-quality wireless connection based on at least the capability of the wireless device 110, the capability of the gateway wireless access device 122, and the capability of each wireless access device 122, 124 in the extended network 120, the path quality from the wireless access device to the gateway, etc.

Figure 3A:
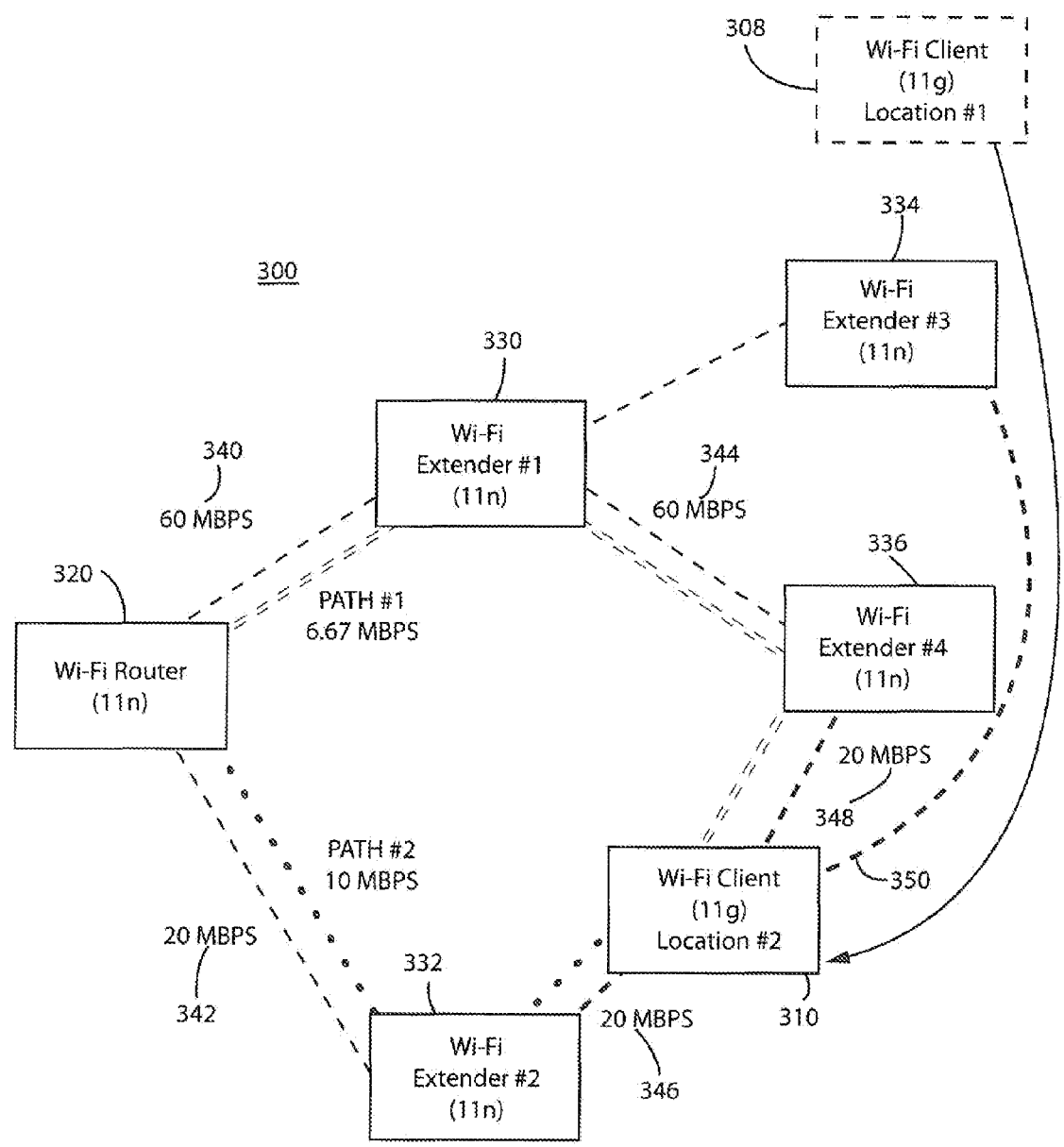
FIGS. 3A-3C are schematic illustrations of an extended networking environment including a plurality of wireless access devices configured to implement an extended network management function, according to an exemplary embodiment.

Referring now also to FIG. 3A, a schematic illustration of an exemplary extended wireless network 300 network topology including a wireless device 310, a gateway wireless access device 320 in the form of a router, and extended wireless access devices 330-336 is illustrated. The network topology may be generated based on exchanged messages communicated between the components of network 300. Each message may include a partial network topology based on the messages received by the component that is transmitting the topology.

Extended wireless network 300 further includes a representation of connection speed 340~350 between wireless communication elements within the extended network 300. Accordingly, the connection speed 340 between gateway wireless access device 320 and a first extended wireless access device 330 is 60 Mega bits per second (Mbps), while the connection speed 342 between gateway wireless access device 320 and a second wireless access device 332 is 20 Mbps. The connection speed is dependent on several factors, including at least the hardware and software installed on each endpoint (i.e. the connection type and the capability of each endpoint) and the distance between the endpoints if it's a wireless connection.

Where wireless device or "Wi-Fi client" 310 is positioned at a first location 308 as shown in ghost form in FIG. 3A, the wireless device 310 may be already connected to the extended wireless access device 334. The wireless connection is designated as 350. However, management system 206 will continually evaluate available wireless connections while the wireless device 310 is moving.

For example, when the wireless device 310 moves to the second location depict in FIG. 3A, (location #2), the wireless connections 350 becomes weak and the wireless device 310 may suffer from the weak wireless connection. Dependent on the wireless device 310's implementation, wireless device 310 may determine if the wireless device 310 needs to try to a different wireless access device to get a better connection based on any of a variety of factors. Such continuous searching for an optimal connection is referred to as roaming in the wireless environment. For example, some implementations are configured to use the existing connection to avoid disruption until that connection is too weak to maintain the connection. The weak wireless connection 350 may be identified by the wireless access devices 334 based on detected poor signal strength between the wireless access device 334 and the wireless device 310. The poor signal strength information may be communicated among the wireless access devices and the management system 206 implemented by each wireless access device 122, 124 will put the poor signal strength information in its table as discussed above.

Further, at the second location, wireless device 310 may have a good wireless connection if it connects to wireless access device 336 or wireless access device 332. This can be detected by the wireless access device 332, 336 by monitoring the signal strength from all the wireless packets sent from the wireless device 310, even if the packets are not transmitted to the wireless access device 332, 336 intentionally. Accordingly, management system 206 is configured to check if the wireless access device 332 or 336 can provide a better connection to the wireless device 310. Generally, the connection speed for a wireless device 310 to the gateway wireless access device 320 is determined by determining the lowest speed among all links (between any two contiguous devices) in the connection path between that wireless device and the gateway wireless access device 320, divided by the number of links between the gateway wireless access device 320 and the wireless device the network device 310. Accordingly, at the second location, the lowest speed in the connection path through wireless access device 336 (path#1) is 20 Mbps, and the connection speed for path#1 is 20 Mbps divided by the three links, which gets 6.67 Mbps. In contrast, while the lowest speed in the connection path through wireless access device 332 (path#2) is also 20 Mbps, the connection speed for path#2 is 20 Mbps divided by the two links, which gets 10.0 Mbps. Accordingly, management system 206 will initiate a wireless connection between the wireless access device 332 and the wireless device 310 based on the higher 10.0 Mbps connection speed.

Figure 3B:
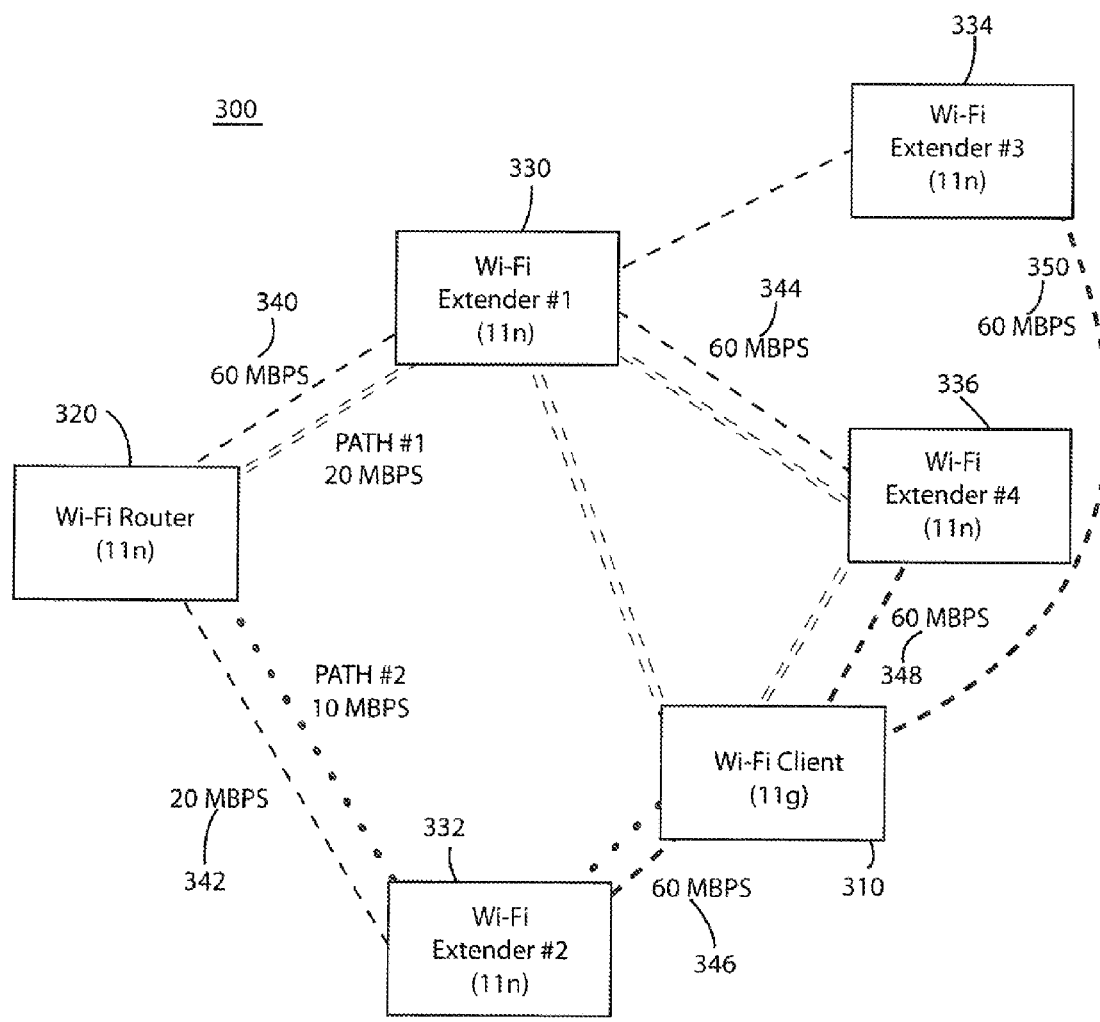

However, referring now to FIG. 3B, where if the wireless device 310 is capable of creating connections with a higher speed to the wireless access device 332 and 336, and the connection speed 346 and 348 for the wireless connection between wireless device 310 and wireless access device 332, 336 is both 60 Mbps. The higher speed of the link will result in a higher connection speed for the path#1 and the consequent connection speed is 60 Mbps divided by 3, which gets 20.0 Mbps. However the connection speed for the path#2 remains at 10 Mbps, even the connection speed 346 has been increased to 60 mbps. That is due to the connection 342 now becomes the bottleneck of the path#2 and that keeps the connection speed for path#2 on 10 Mbps. Accordingly, management system 206 will initiate a wireless connection between the wireless access device 336 and the wireless device 310 based on the higher 20.0 Mbps link rate.

Figure 3C:
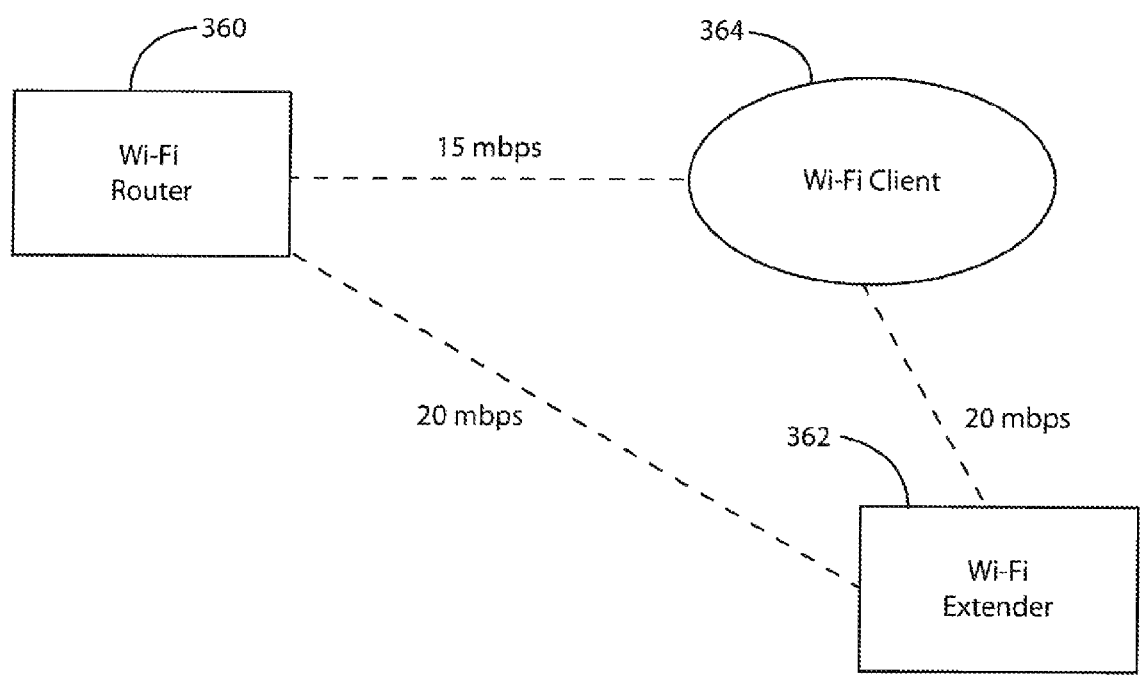

Referring now to FIG. 3C, a schematic illustration of another exemplary extended wireless network 300 including a wireless device 364, a gateway wireless access device 360 in the form of a router, and an extended wireless access devices 362 is illustrated. If the wireless device 364 connects to the wireless access device 362, the connection speed between the wireless device 364 and the gateway wireless access device 360 is 20 mbps divided by 2, which is 10 Mbps. If the wireless device 364 connects to the gateway wireless access device 360 directly, the connection speed is 15 Mbps. The management system 206 will consider the wireless access device 360 provides a better connection for the wireless device 364, even though, from the wireless device 364's point of view, the wireless access device 362 provides a better connection. As shown in FIG. 3C, in a wireless extended network, a wireless device has multiple wireless access devices to connect to and a wireless access device that has stronger signal may not be a better choice to provide a faster connection speed to the gateway device.

Figure 4:
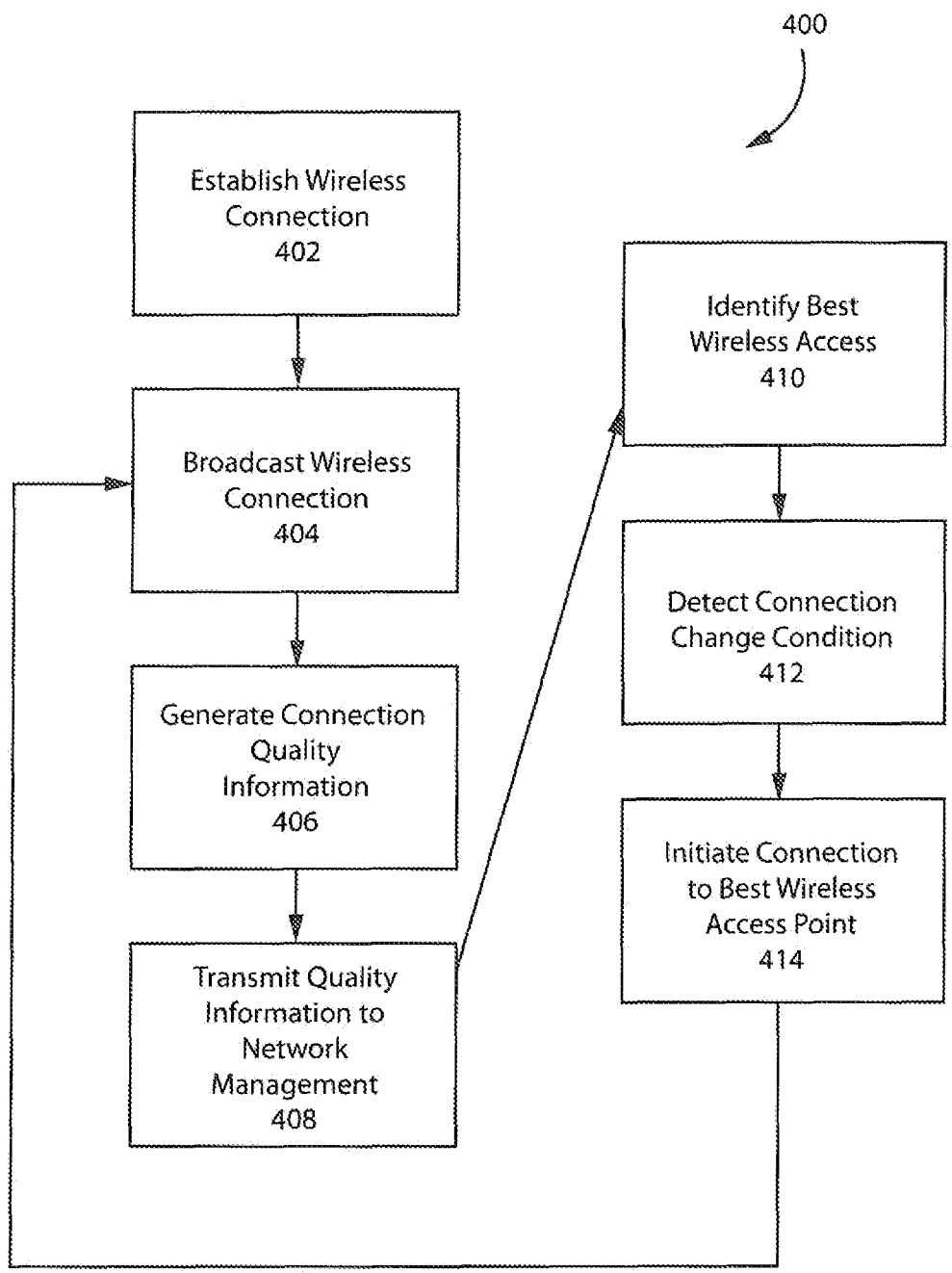
FIG. 4 is a flowchart illustrating a method for configuring device connections in an extended network environment, according to an exemplary embodiment.

Referring now to FIG. 4, a flowchart 400 illustrating a method for implementing the extended network management system 100 of FIG. 1 to identify a high quality wireless connection for a wireless device 110 is shown, according to an exemplary embodiment. Although flowchart 400 includes multiple steps performed in a defined order, the functions described herein can be performed using more, less and/or a different ordering of steps.

In a first step 402, wireless device 110 (FIG. 1) creates a wireless connection with one wireless access device 122 or 124 in the extended network 120. The wireless connection may be created based on an initial use of the wireless device 110, based on establishment of a new connection following a loss in connection, based on a specific elapsed time, etc. Establishing a wireless connection may include performance of a handshake protocol and the exchange of data packets as is well known in the art. Once a wireless connection is established, the wireless access device establishing the connection is considered the current wireless access device.

In a step 404, upon establishment of the wireless connection, the current wireless access device, including at least gateway wireless access device 122 and possibly additionally including one or more extended wireless access devices 124, is configured to transmit the establishment of the wireless connection and the identity of the wireless device to other access devices within the extended network 120.

In a step 406, each wireless access device in extended network 120 that is within wireless range of the wireless device 110 will begin receiving data packets from the wireless device 110 based on the wireless connection to the current wireless access device. Generally, wireless access devices in extended network 120 other than the current wireless access device will not process the data packets transmitted to the current wireless access device they typically discard those packets. However, based on the received data packets, each wireless access device in extended network 120 is configured to generate wireless connection quality information describing a real or theoretical wireless connection between that wireless access device and the wireless device 110. Step 406 may be performed for an indefinite time or a defined period of time, such as 3 seconds.

In a step 408, each wireless access device having wireless connection quality information for wireless device 110 exchanges the generated information with each other wireless access device in the extended network 120, and those information is kept in a repository such as network management table 208 and/or network management system 206, described above with reference to FIG. 2. According to an exemplary embodiment, the repository could be located in the memory of any wireless access device 122 or 124, such as table 210 of FIG. 2.

In a step 410, the gateway wireless access device 122 or the current wireless access device 122 or 124 analyzes the received wireless connection quality information to identify the wireless access device that can provide the highest quality wireless connection to the wireless device 110. It is important to recognize that the highest quality connection may vary dependent upon the intended use of the wireless connection. For example, if wireless device 110 is utilized to implement an IP telephony application, a link rate may be the primary factor in identifying a high quality wireless connection. Alternatively, if wireless device 110 does not include the capability to manage an excess amount of dropped packets, the wireless connection quality may be identified based on the fewest number of dropped packets.

In a step 412, a wireless access device 122 or 124 that does centralized control or the current wireless access device identifies any change in the condition of the wireless connection to the current wireless access device. The connection check may be performed using the method described above with reference to FIG. 1. Alternatively, the central control wireless access device 122 or 124 or the current wireless access device may be configured to periodically determine whether to change the wireless connection from the current wireless access device to a new wireless access device based on a determination that the new wireless access device can provide a higher quality wireless connection and the connection transfer will not disrupt the applications running on the wireless device 110.

In a step 414, a wireless connection is established to the wireless access device providing the highest quality wireless connection. The connection may be established based on a message transmitted from the central control wireless access device 122 or 124 to the new wireless access device. Alternatively, the connection may be established based on a determination made at the current wireless access device. In either event, the resulting "current" wireless access device may be the same wireless access device to which the wireless device 110 was connected prior to the connection query of step 410 or a different wireless access device. The process then returns to step 404, where the steps 404-414 are repeated on an ongoing basis.

When a wireless device 110 is joining an extended network 120 (that is, during the step 402), similar mechanism can also be used to determine the best wireless access device 122 or 124 for the wireless device 110. When a wireless device 110 attempts to join a network, it usually sends out some packets to discover the environment and it has to send out a request packet for joining a network. By observing the signal strength from these packets and examining the packet contents, a wireless access device 122 or 124 can estimate the connection quality if the wireless device 110 connects to it. Furthermore, a wireless access device 122 or 124 can estimate the data transmission speed between the wireless device 110 and the gateway wireless device 122 if the wireless device 110 reaches the gateway wireless device 122 through it.

According to an alternative embodiment, network management system 206 may be implemented as a distributed management system, such that an embodiment of the network management system 206 is resident in every wireless access device within extended network 120. In such a system, wireless access devices exchange information with each other and each wireless access device is aware of which wireless access device can provide the highest quality wireless connection to the wireless device 110.

Certain terminology is used herein for purposes of reference only, and thus is not intended to be limiting. For example, terms such as "network device" refer to any system or device receiving and retransmitting information packets in a computer network.

References to "a server" and "a processor" can be understood to include one or more controllers or processors that can communicate in a stand-alone and/or a distributed environment(s) and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It should be understood that a computer program may embrace constituent programs and that multiple programs may be implemented as a single or multiple programs.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein, explain the best modes known for practicing the invention and will enable others skilled in the art to utilize the invention.

What is claimed is:

1. A gateway router configured to facilitate wireless connection management in an extended wireless network, comprising:
    a network device input connected at least indirectly to an internal network and configured to communicate a plurality of data packets to and from at least one computer system;
    a network device output connected at least indirectly to an external network and configured to communicate the plurality of data packets to and from at least one computer system; and
    a computer processor configured to execute steps, including
        receiving packets from a wireless device,
        identifying the wireless device within a table of wireless devices connected to a wireless access device in an extended wireless network,
        generating wireless connection quality information for the wireless device specific to the wireless access device, the wireless connection quality information including wireless connection quality information for at least one indirect communication path having at least one network extender device to establish the communication path between the gateway router and the wireless access device.

2. The gateway router of claim 1, wherein the computer processor is further configured to transmit the wireless connection quality information to other wireless access devices in the extended network.

3. The gateway router of claim 1, wherein the computer processor is further configured to receive wireless connection quality information from a plurality of other network devices and to identify network device in the extended network providing the highest quality wireless connection for the wireless device.

4. The gateway router of claim 3, wherein the processor is farther configured to initiate a wireless connection between the network device having the highest wireless connection quality and the wireless device.

5. The gateway router of claim 4, wherein the processor is further configured to initiate the wireless connection with the network device having the highest wireless connection quality based on a connection check between the network device and the wireless device.

6. The gateway router of claim 1, wherein the wireless connection quality information includes at least one of a wireless signal strength, a connection capability, a utilization status, a network topology, and a connection patch quality.

7. An extended network configured to implement an extended management function to identify a wireless access device providing a highest quality wireless connection to a wireless device, comprising:
    a gateway device configured to enable communication between the extended network and an external network;
    at least two wireless access devices in the extended network; and
    at least one wireless device having a wireless connection to a at least one of the wireless access devices,
    wherein the gateway device and the wireless access devices include a processor executing the extended management function to identify the wireless access device providing the highest quality wireless connection based on wireless connection quality information, the wireless connection quality information including wireless connection quality information for at least one indirect communication path having at least one network extender device to establish the communication path between the gateway device and the wireless access device, exchanged among the wireless access devices and the gateway device.

8. The extended network of claim 7, wherein the extended network is configured in a tree topology including the gateway device as a root, one or more wireless access devices as nodes in the tree, and a wireless device as a leaf.

9. The extended network of claim 7, wherein each wireless access device is configured to generate wireless connection quality information for received packets from the wireless device in consideration and to transmit the wireless connection quality information to one or more wireless access devices in the extended network.

10. The extended network of claim 7, wherein at least one wireless access device is configured to initiate a connection between the wireless access device having the highest quality wireless connection for the wireless device and the wireless device.

11. The extended network of claim 10, wherein at least one wireless access device is further configured to initiate the connection to the wireless access device having the highest wireless connection quality based on a connection check between the at least one wireless access device and the wireless device.

12. The extended network of claim 10, wherein the current wireless access device is further configured to check the connection quality for the wireless device on a periodic interval.

13. The extended network of claim 7, wherein the wireless connection quality includes at least one of a wireless signal strength, a noise level, a connection capability for a wireless device, a connection capability for a wireless access device, an extended network topology, a utilization status and a connection path quality.

14. The connection quality of claim 13, wherein the connection path quality for a wireless device is the connection quality between the wireless device and the gateway device.

15. The extended network of claim 10, wherein a first wireless access device is further configured to initiate the connection between the wireless access device having the highest wireless connection quality and the wireless device based on a connection check between at least one wireless access device and the wireless device, wherein the wireless access device having the highest wireless connection quality may be the first wireless access device.

16. A computer implemented method for identifying a wireless access device providing a highest quality wireless connection to a wireless device, comprising
receiving data at a plurality of wireless access devices in an extended network from a wireless device having a current wireless connection to a current wireless access device amongst the plurality of wireless access devices; and
generating wireless connection quality information at each wireless access device in the plurality of wireless access devices describing the quality of a wireless connection between the wireless device and the wireless access device generating the quality information;
transmitting the wireless connection quality information from the wireless access device to at least a gateway router communicating indirectly using a network extender device to establish the communication path with the wireless access device and communicating with a network external to the extended network.

17. The method of claim 16, further including transmitting or exchanging the wireless connection quality information from a wireless access device to/with other wireless access devices in the extended network.

18. The method of claim 17, wherein at least one wireless access device is configured to initiate a wireless connection between the wireless access device having the highest quality wireless connection for the wireless device and the wireless device.

19. The extended network of claim 18, wherein at least one wireless access device is further configured to initiate the wireless connection with the wireless device having the highest wireless connection quality based on a connection check between the at least one wireless access device and the wireless device.

20. The method of claim 16, wherein the wireless connection quality includes at least one of a wireless signal strength, a noise level, a connection capability for a wireless device, a connection capability for a wireless access device, an extended network topology, a utilization status and a connection patch quality.

21. The method of claim 17, wherein a first wireless access device is further configured to initiate the wireless connection between the wireless access device having the highest wireless connection quality and the wireless device based on a connection check between at least one wireless access device and the wireless device, wherein the wireless access device having the highest wireless connection quality may be the first wireless access device.

* * * * *